United States Patent
Waugh et al.

(10) Patent No.: US 10,839,254 B2
(45) Date of Patent: Nov. 17, 2020

(54) SUPPORTING MANIFEST LIST FOR MULTI-PLATFORM APPLICATION CONTAINER IMAGES

(71) Applicant: Red Hat, Inc., Raleigh, NC (US)

(72) Inventors: Tim Waugh, Farnborough (GB); Jindrich Luza, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/518,435

(22) Filed: Jul. 22, 2019

(65) Prior Publication Data

US 2019/0347517 A1 Nov. 14, 2019

Related U.S. Application Data

(63) Continuation of application No. 15/672,011, filed on Aug. 8, 2017, now Pat. No. 10,387,750.

(51) Int. Cl.
| | |
|---|---|
| G06K 9/00 | (2006.01) |
| G06K 9/62 | (2006.01) |
| G06F 9/455 | (2018.01) |
| H04L 29/08 | (2006.01) |
| G06T 1/00 | (2006.01) |
| H04L 29/06 | (2006.01) |

(52) U.S. Cl.
CPC .......... *G06K 9/6218* (2013.01); *G06F 9/455* (2013.01); *G06K 9/00979* (2013.01); *H04L 67/1097* (2013.01); *H04L 67/02* (2013.01); *H04L 67/06* (2013.01); *H04L 67/34* (2013.01); *H04L 67/42* (2013.01)

(58) Field of Classification Search
CPC .................................. G06K 9/00; H04L 67/02
USPC .......................................................... 382/225
See application file for complete search history.

(56) References Cited

U.S. PATENT DOCUMENTS

| | | |
|---|---|---|
| 2016/0381075 A1 | 12/2016 | Goyal et al. |
| 2017/0083544 A1* | 3/2017 | Alton ........................ G06F 8/60 |

OTHER PUBLICATIONS

Osb, "Multi-Platform Container Image Builds", Designs for Future Changes, 2016, 28 pages.
Microsoft, "Azure Container Registry Repositories", Contributors, Mar. 24, 2017, 3 pages.
Microsoft, "Azure Container Registry Now Generally Available", Azure Developer Experiences, Apr. 7, 2017, 7 pages.

(Continued)

*Primary Examiner* — Abolfazl Tabatabai
(74) *Attorney, Agent, or Firm* — Lowenstein Sandler LLP

(57) ABSTRACT

Implementations of the disclosure provide a method comprising generating, by a processing device, a group repository in view of a plurality of image repositories comprising image manifests. An image manifest comprising an application image and an image platform specifier specifying platform resources for executing the application image from the image repositories is identified. The image manifest is clustered into one or more group members of the group repository in view of the image platform specifier. Each group member references at least a key and a value associated with the key. The key references the image manifest and the value references a manifest list describing a plurality of platforms to execute the application image associated with the image manifest. Thereupon, a data object to redirect a client device to a location comprising the one or more group members of the group repository is published.

19 Claims, 8 Drawing Sheets

(56) References Cited

OTHER PUBLICATIONS

Amazon AWS, "Container Image Manifest Formats" Amazon EC2 Container Registry, accessed May 5, 2017, 2 pages.
Nexus, "Nexus Repository Manager 3.3", Sonatype, accessed May 5, 2017, 28 pages.
Docker, "Image Manifest V 2, Schema 2", Docker Documentation, accessed May 5, 2017, 6 pages.
USPTO, Notice of Allowance for U.S. Appl. No. 15/672,011, dated Apr. 9, 2019.

* cited by examiner

SUPPORTING MANIFEST LIST FOR MULTI-PLATFORM APPLICATION CONTAINER IMAGES

RELATED APPLICATIONS

This application is a continuation of U.S. patent application Ser. No. 15/672,011 filed on Aug. 8, 2017, the entire content of which is incorporated by reference herein.

TECHNICAL FIELD

The implementations of the disclosure relate generally to computing infrastructures and, more specifically, relate to supporting manifest list for multi-platform application container images.

BACKGROUND

Containerization is an operating-system-level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
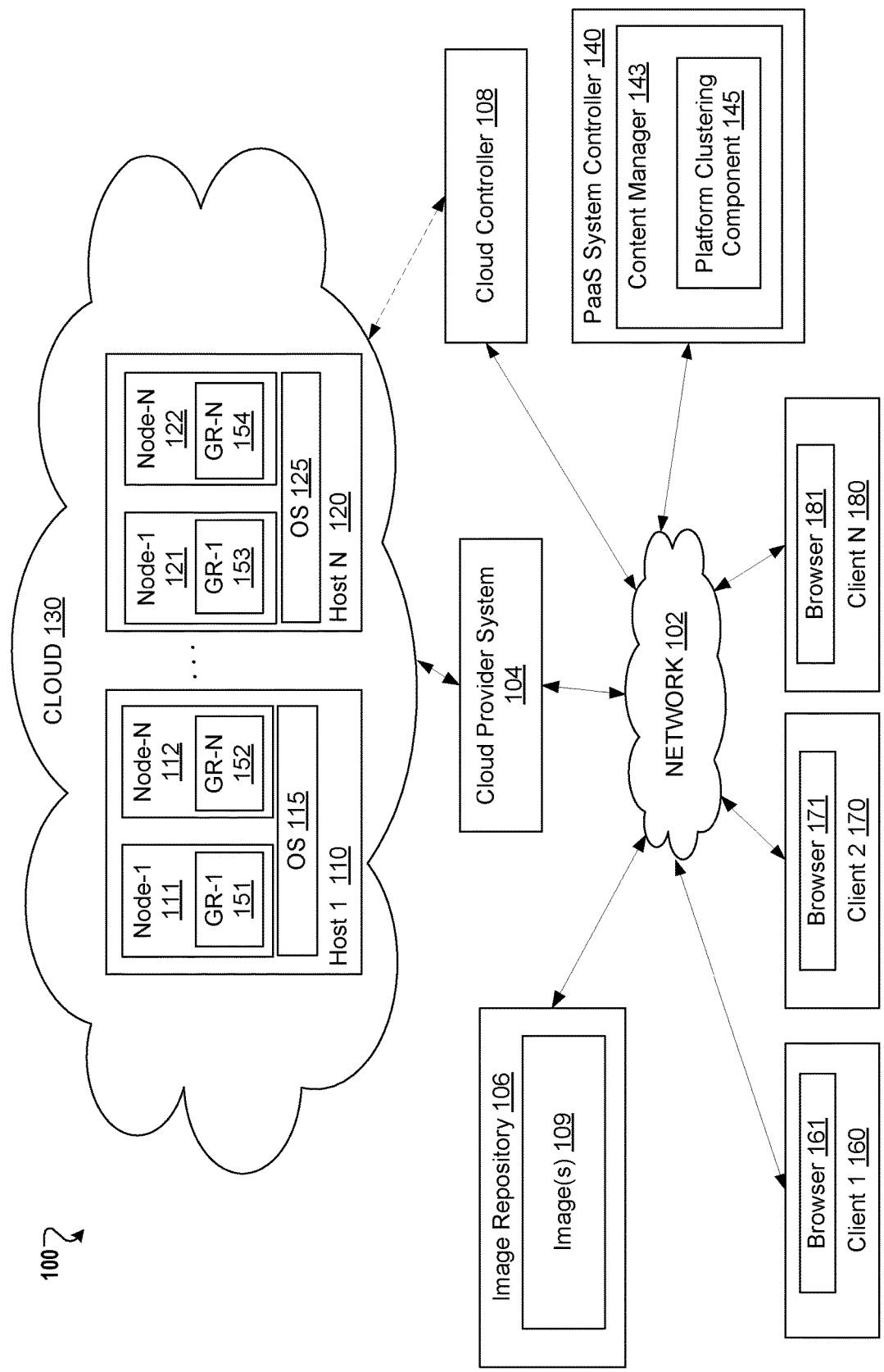
FIG. 1 is a block diagram of a network architecture in which implementations of the disclosure may operate.

Containers are used in various types of systems to provide a secure environment that is isolated from other processes on the system. Many Platform-as-a-Service (PaaS) systems, such as OpenShift™, utilize containers to provide certain services to clients. A PaaS system provides a platform and environment that allows clients to build applications and services over the internet. Although implementations of the disclosure are described in accordance with a PaaS system, this should not be considered as limiting the scope or usefulness of the features of the disclosure. For example, the features and techniques described herein can be used with other types of systems that utilize various kinds of containers.

A client application may be executed in a container that provides a self-contained secure process space in the system. The term "application" is used to refer to any combination of software products that may perform a desired function. In some cases, an application may be a single software program that operates with a hardware platform. Some applications may use multiple software components, each of which may be written in a number of different programing languages and may execute a plurality of different application processes on the hardware platform.

The PaaS system provides data associated with different applications to a plurality of clients. This data may be used for the execution of applications which may include an "image" built from pre-existing application components and source code of the application. An image refers to data representing executables and files of the application used to deploy functionality for a runtime instance of the application. In one implementation, the image can be built using a particular tool, such as Docker™ tool, and is also referred to as a Docker image. The tool generates an image for an application by combining pre-existing ready-to-run image corresponding to core functional components of the application (e.g., a web framework, database, etc.) with source code specific to the application. The resulting application image may be stored in an image repository (e.g., data storage system) for subsequent use in launching instances of the application images for execution in the PaaS system.

Each image may be associated with an "image manifest," which is a type of data object describing the image and multiple image "blobs," e.g., data items of the image. For example, the image manifest contains a list of filesystem layer blobs which can be combined sequentially to create the filesystem in the container image. One such image blob may include a "config" blob that specifies image metadata, such as which commands to execute when starting a container from the container image, the processor architecture for executing the container from this image as well as other information. The image manifests can be stored on a "manifest list."

The manifest list is another type of data object stored in an image repository that refers to other objects in the same repository. For example, the manifest list may be a JSON data object describing an array comprising a plurality of items where each item includes an image manifest and a "platform specifier" (e.g., a data structure) specifying a processor architecture and operating system for each image manifest. The image platform specifier may include a plurality of data fields that specifies, for example, the processor architecture, operating system and other data fields associated with executing the images of the image manifest.

A content manager (e.g., Pulp™) associated with the PaaS system can be used to manage the images. For example, the images of the image repository can be stored on a content distribution network (CDN) service. This CDN service can mirror or otherwise copy either part or all of the contents of the image repositories by storing the contents in a particular path. The CDN is used for distributing contents of the image repository in geographic proximity to the client. For example, the contents of the image repositories of the PaaS system may be hosted on a server machine that is geographically dispersed from where the client is running.

In some situations, the contents of the image repositories can be protected by requiring the client to supply an entitlement certificate to access a particular image repository. The path on the CDN determines which entitlement certificates are to be used to access the particular image repository. For example, the content manager generates an entitlement certificate for a specified path that grants access to a certain image repository of the PaaS system. When the repository is published, the content manager ensures that contents of that image repository are put into the specified path of the CDN. When the client supplies the entitlement certificate, the client is then give access to content of the image repository that are stored in the path associated with that certificate.

The PaaS system may include a registry component (e.g., a Docker™) registry that can reference multiple image repositories. Each of these image repositories has different paths in the CDN. Within a single repository there may be multiple 'tags' where each tag refers to a single object which may be an image manifest or a manifest list. An application interface (e.g., Crane™) can make the content of the image repositories stored in the CDN available to clients via an API for the registry component. For example, the application interface (e.g., Crane™) may be a read-only implementation of the registry component. The content manager (e.g., Pulp™) configures each registry entry associated with the interface with information regarding the repositories and images the manager has published (e.g. to the CDN). This configuration allows a client to run a command that use a particular repository tag to pull a container image stored in the CDN in a one-to-one relationship.

There are, however, several issues that can occur due to the one-to-one relationship, for example, when different entitlement certificates are required to access images for particular platforms. For example, the entitlement certificate checking operates by the path on the CDN, so a single repository having a single path means that all accesses to that repository will require the same entitlement. In this regard, there is no way to distinguish entitlements based on the image within the repository. As such, all of the images for a specific platform have to be placed in the same path on the CDN. As such, the application interface is not capable supporting a "manifest list" via the CDN in which different platform-specific images reside in the same repository without separate entitlements being necessary to access image content for different platforms. As a result, this can severely impact the clients due to the extra overhead of handling all of these different entitlements for each platform that the client desires to execute the images. For example, the clients may have to pull images from a specially-named repository for a desired architecture instead of being able to pull images from the same repository regardless of architecture.

Implementations of the disclosure address the above-mentioned and other deficiencies by providing a platform clustering component of the content manager identifies each of the platform-specific image manifests for a particular application in the image repositories, and then clusters these image manifests together using a newly generated "group" repository for publishing to clients. Each group repository is generated with its own entitlement certificate by the platform clustering component to grant access to the group repository, an additional repository name for the group repository as well as an additional path on the CDN to the location of contents for the group repository.

The platform clustering component assembles content referencing the image manifests used in the image repositories for a particular application into group repository. This content is then written to disk by the platform clustering component into the location of the group repository on the path of the CDN. To assemble the content, the platform clustering component inspects the image manifests to determine the platform resources set in the image platform specifier for executing the images associated with each of the image manifests. The image platform specifiers associated with image manifests are used to create a manifest list. For example, a first image manifest for an image may have a tag="latest" and an image platform specifier="first architecture", and a second image manifest also has a tag="latest" and an image platform specifier="second architecture. In this example, since both have the same tag value (within the group of repositories) a manifest list is created by the platform clustering component to describe them. In that regard, the manifest list may list the both digest for the image manifests as in the following example.

```
manifests": { "digest": (digest of the first image manifest),
          "platform": {"first architecture": "XXXX"},
       },{
          "digest": (digest of the second image manifest),
          "platform": {"second architecture": "YYYY"}
       }
```

When the content manager publishes this new group repository, it provides a data object (e.g., a data file) that specifies the location for the contents of the group repository. For example, the data file that includes a 'single-platform Image Manifests' key-value mapping for tags which only appear in a single repository. The values are the CDN paths to redirect a client for a given key, and the keys in this mapping are for both the tag name and digest for each image manifest. In addition, the data file includes a 'single-platform blobs' key-value mapping for blobs which only appear in a single repository. The values are the CDN paths to redirect a client for a given key, and the keys in this mapping are for each blob referenced by an image manifest. The data file further includes a 'Manifest List tags' key-value mapping where the keys are tags of image manifests common to multiple repositories and the values are pairs consisting of (1) a set of manifest list digests generated by the platform clustering component, and (2) the CDN path for image manifest from the group's "default" repository. For backward compatibility, the image manifests of the default image repository are served to clients that do not accept manifest list.

When a client requests the creation of an application instance, the client may be requested by the content manager to provide the entitlement certificate for accessing the images in the group repository for the application. For example, the client may have purchased or been provided access to the entitlement certificate by the PaaS system as part of a user account subscription associated with the client. When the client provides the entitlement certificate, the client is then redirected to the group repository on the CDN. For example, the client may be presented with the set of manifest list that comprises a listing of the multiple platform-specific images for the application that are now residing the same group repository.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems.

The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host N 120, implemented as part of the cloud 130. In some implementations, the host machines 110, 120 are often located in a data center. For example, nodes 111 and 112 are hosted on physical host machine 110 in cloud 130 provided by cloud provider 104. When nodes 111, 112, 121, 122 are implemented as VMs, they may be executed by an Operating System (OS) 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding web browser applications 161, 171 and 181. In some implementations, the web browser applications 161, 171 and 181 may include an application interface (e.g., Crane™) that can make the content of the image repositories 106 available to clients 160, 170 and 180. In other implementations, the applications may be hosted directly on hosts 1-N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106. This data may be used for the execution of applications for a multi-tenant PaaS system managed by the cloud provider controller 140.

In one implementation, the data used for execution of applications includes application images 109 built from pre-existing application components and source code of the application. As discussed above, an image refers to data representing executables and files of the application used to deploy functionality for a runtime instance of the application. In one implementation, the images 109 can be built using a Docker™ tool and is referred to as a Docker image. In other implementations, the application images 109 can be built using other types of containerization technologies. An application image may be built in the PaaS system using an image build system (not shown) of the PaaS system. The image build system may be provided on components hosted by cloud 130, on a server device external to the cloud 130, or even run on nodes 111, 112, 121, 122. The image build system generates an application image 109 for an application by combining pre-existing ready-to-run application image corresponding to core functional components of the application (e.g., a web framework, database, etc.) with source code specific to the application provided by the user. The resulting application image 190 may be pushed to an image repository 106 for subsequent use in launching instances of the application images 109 for execution in the PaaS system.

Upon receiving a command identifying specific data (e.g., application data and files, such as application images, used to initialize an application on the cloud) from the PaaS provider controller 140, the cloud provider 104 retrieves the corresponding data from the image repository 106, creates an instance of it, and loads it to the host 110, 120 for execution by nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may represent a single data structure or multiple data structures (databases, repositories, files, etc.) residing on one or more mass storage devices, such as magnetic or optical storage based discs, solid-state-drives (SSDs) or hard drives.

The PaaS system 100, in implementations, may include a content manager 143 (e.g., Pulp™) to manage the images 103. For example, the images 103 of the image repository 106 can be stored on a content distribution network (CDN) service. This CDN service can mirror locally to the client either part or all of the contents of the image repositories by storing the contents in a particular path. The CDN is used for distributing contents of the image repository 103 in geographic proximity to the client 160, 170, 180. For example, the contents of the image repositories 106 may be hosted on a Node 111, 112, 121, 122 that is geographically dispersed from where the client 160, 170, 180 is running.

The content manager 143 may include a platform clustering component 145 that is utilized to create group repositories, such as GR-1 through N 151,152,153,154. These group repositories 151,152,153,154 are used to provide images common to multiple platform-specific image repositories in the same group repository. In some aspects, the platform clustering component 145 assembles image manifests that are stored in various image repositories for a particular application into a newly created group repository 151,152,153,154. The platform clustering component 145 communicates with each node 111, 112, 121, 122 and the PaaS system controller 140 in order to manage and provide access to contents of the location of the group repositories 151, 152, 153, 154 for executing application images for the client devices 160, 170, 180.

While various implementations are described in terms of the environment described above, the techniques described herein may be implemented in a variety of other environments including a single, monolithic computer system, as well as various other combinations of computer systems or similar devices connected in various ways. For example, the platform clustering component 145 may be running on a node of the PaaS system 100 hosted by cloud 130, or may execute external to cloud 130 on a separate server device. In some implementations, the platform clustering component 145 may include more components that what is shown that operate in conjunction with the PaaS system 100. In another example, data from the application image 109 may run directly on a physical host 110, 120 instead of being instantiated on nodes 111, 112, 121, 122. In some implementations, an environment other than a VM may be used to execute functionality of the PaaS applications. As such, in some implementations, a "node" providing computing functionality may provide the execution environment for an application of the PaaS system. The "node" may refer to a VM or any other type of computing environment.

Figure 2:
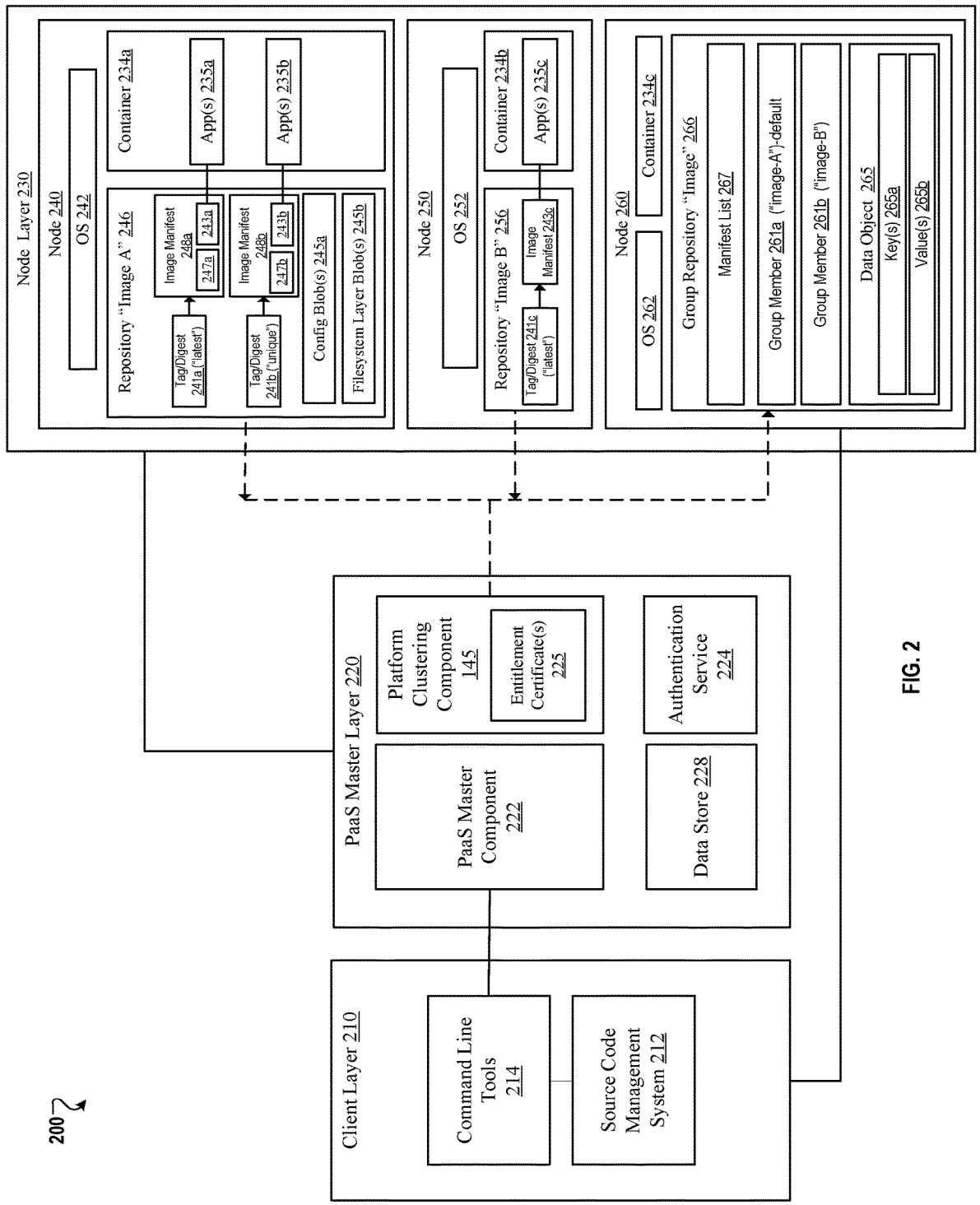
FIG. 2 is a block diagram of a Platform-as-a-Service (PaaS) system architecture according to an implementation of the disclosure.

FIG. 2 is a block diagram of a Platform-as-a-Service (PaaS) system architecture 200 to support manifest lists for multi-platform application container images according to an implementation of the disclosure. The PaaS system architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230. In one implementation, the components of the PaaS system architecture 200 are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 and the node layer 230 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

The client layer 210, in implementations, includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 246 and 256, at the respective node(s) 240 and 250 running the associated application. From the remote SCM repository 246 and 256, code of the packaged software application may be edited by others with access, or the application may be executed by a machine. Other SCM systems work in a similar manner.

The client layer 210, in one implementation, also includes a set of command line tools 214 that a user can utilize to create, launch, and manage applications using a PaaS system. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as is described in more detail further below in accordance with some implementations.

The PaaS master layer 220 acts as middleware between the client layer 210 and the node layer 230. The node layer 230 includes the nodes 240, 250 and 260 on which applications 235*a-c* are provisioned and executed. In one implementation, each node 240, 250 and 260 is a VM. In some implementations, the VMs are provisioned by an Infrastructure as a Service (IaaS) provider. In other implementations, the nodes 240, 250 and 260 may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action (e.g., creating, removing, and/or managing a container) on a container, such as containers 234*a-c*, a request to deploy source code of an application, a request to designate a system to host a remote SCM repository (e.g., an indication that a system has been designated by a user to host a remote SCM repository), etc.

A container 234*a-c* is a secure process space on the nodes 240, 250, 260 to execute functionality of an application 235*a-c*. In some implementations, a container 234*a-c* is established at the nodes 240, 250, 260 with access to certain resources of the underlying node 240, 250, 260, including memory, storage, and security types and/or labels to be applied to any functions executed by the containers 234*a-c*. In one implementation, the containers 234*a-c* may be established using the Linux Containers (LXC) method. In further implementations, containers 234*a-c* may also be established using cgroups, SELinux™, and kernel namespaces, to name a few examples. The application image instances for an application 235*a-c* launched in containers 234*a-c* may be dispersed over more than one node 240, 250, 260. In other implementations, application images instances for an application 235*a-c* may run in one or more containers 234*a-c* on the same node. Furthermore, an application 235*a-c* may use more than one application image as part of providing functionality for the application 235*a-c*. One example of this is a JavaEE™ application that uses a JBoss™ application server-based application image with a supporting MySQL™ database provided by a MySQL™ based application image.

A user, using the command line tools 214 at client layer 210, can request the creation of a new application 235*a-c*, deployment of source code of the application 235*a-c*, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the PaaS system by authentication service 224, the PaaS master component 222 uses a server orchestration system (not shown) to collect information about the nodes 240, 250 and 260.

The information collected about the nodes 240, 250 and 260 can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 240, 250 and 260 is stored in the form of a JavaScript™ Object Notation (JSON) blob or string that maintains key-value pairs to associate a unique identifier, a hostname, a list of applications, and other such attributes with the node.

A node 240, 250, 260 may run an application 235a-c by launching an instance of an application image in a container 234a-c on the node. An application image includes the underlying support software that implements the functionality of applications 235a-c. An application image for an application may be built at build system (not shown), which may be separate from or part of node layer 230. The build system may generate an application image from a combination of pre-existing ready-to-run application images related to core functionality of the application and source code provided by a user of the application. Each application image built at build system may map to a functional component of the application 235a-c. As such, an application 235a-c may have more than one application image associated with the application. Built application images may be pushed to image repository 246, 256 for storage and accessibility for subsequent use in launching instances of the application images at containers 234a-c in nodes 240, 250, 260.

To launch an instance of an application image, the nodes 240, 250, 260 may retrieve an image manifest, such as image manifests 248a-c. The image manifests provide the data (e.g., image blobs) for determining the format of the application images in the image repositories 246, 256. Each image manifest, such as image manifest 248a-b, may include an application image, such as application image 243a-b, and an image platform specifier, such as image platform specifiers 247a-b, that specifies platform resources for executing a respective application image. These image manifests 248a-c may be referenced by either a (textual) "tag" string or a hash value (also referred to as a "digest") 241a-c that is calculated to verify contents in the image manifests 248a-c.

Each of the image manifests 248a-c is a type of data object (e.g., JSON object) describing the image and multiple image "blobs," such as image blobs 245a-b that are stored in the image repositories 246, 256. These image blobs 245a-b comprise metadata of the image that may include, but not limited to, a list of filesystem layer blobs 245a which can be combined sequentially to create the filesystem in the container image, and an "config" blob 245b specifying platform resources, such as the host architecture and operating system on which the image is intended to run on, as well as other types of data for the image.

In some implementations, the PaaS system 200 includes the platform clustering component 145 that identifies platform-specific image manifests in the image repositories 246, 256 and then clusters these image manifests together using a newly generated "group" repository 266 for publishing to clients associated with the client layer 210. The platform clustering component 145 generates an entitlement certificate 225 to provide authenticated access to the group repository 266, an additional repository name for the group repository 266 as well as a location on disk (e.g., data store 228) for storing the contents for the group repository 266. For example, group repository 266 of FIG. 2 is shown with the name "Image" that is stored in location " . . . /image."

The platform clustering component 145, in implementations, assembles the image manifests 246-c used for a particular application in the group repository 266. For example, the platform clustering component 145 inspects the "config" image blob 245a associated with the image manifest to determine an image platform specifier specifying platform resources, such as the platform architecture and operating system, to execute the images associated with each of the image manifests 248a-c. The image platform specifiers associated with image manifests 243a-c are used to create a manifest list 267. The manifest list 267 is a top-level data object stored in the group repository 266 that refers to the location of other objects in the same repository. For example, image manifest 248a may have a tag 241a="latest" and an image platform specifier="first architecture", and image manifest 248c may also have a tag 241c="latest" and an image platform specifier="second architecture. In this example, since both have the same tag value (within the group of repositories) a manifest list 267 is created by the platform clustering component 145 to that describe them both.

To make the group repository 266 available to clients at the client layer 210, the platform clustering component 145 assembles the one or more manifest lists 267 into the group. For example, the platform clustering component 145 retrieves the image manifests 248a-c by both the tag and digest (which can be calculated as a checksum of the content of the object) for each image manifest. Then, the platform clustering component 145 identifies tags that are unique to a single repository, and tags that are present in multiple repositories, for the group repository 266. As in this example, since both image manifest 248a and image manifest 248c have the same tag value "latest" within the group repository 266, a manifest list 267 is created by the platform clustering component 145 to describe them both. In this example, the image platform specifier for the image manifest 248a is different from the image platform specifier for the image manifest 248c. For example, the platform for executing images on image manifest 248a may be for a one type of architecture while the platform for executing images on image manifest 248c may be for another type of architecture.

In some implementations, the platform clustering component 145 clusters a reference for the image manifest 248a-c into one or more group members 261a-b of the group repository 266 in view of the image platform specifier for each image manifest. For example, each group member 261a-b may be a data structure comprising a plurality of data fields indicates the properties of the image manifests associated with that group member. For example, the property for one of the group members 261a-b may be a Boolean value with the constraint that exactly one group member must be set as a default member for the group.

Each group member 261a-b references at least a key 265a and a value 265b associated with the key 265a. The key 265a may reference one of the image manifests 248a-c and the value 265b may reference one or more platform specific images to execute an application image associated with that image manifest. For example, tags or blobs may be of image manifest 248a-c that only appears in a single repository. The keys 265a are mapped to the tag name, digest and blobs for a given image manifest and the values 265a are mapped to the CDN paths to redirect a client for the given image manifest. For keys 265a mapped to tags of image manifest 248a-c common to a multiple repository, the values 265b are a pair of values consisting of (1) a set of manifest list digests generated for manifest lists 267 in the group repository 266, and (2) the CDN path for the group's "default" repository. For backward compatibility, the image manifests of the default image repository are served to clients that do not accept manifest list.

Then, the platform clustering component 145 publishes the group repository 266 by providing a data object 265 that can be read by clients. The data object 265 (e.g., a data file) specifies the location for the contents of the group repository 266. For example, the data object 265 comprises the key-value 265a-b mappings associated with the group repository 266. This data object 265 may be used to redirect a client request for an application image to the location of contents for the group repository 266. For example, when a client (e.g., client 160, 170, 180) provides the entitlement certificate 225, the client may be presented via the client layer 210 a listed of the contents in the group repository on the disk to access the multiple platform-specific image repositories associated with the image manifests 248a-c.

Figure 3:
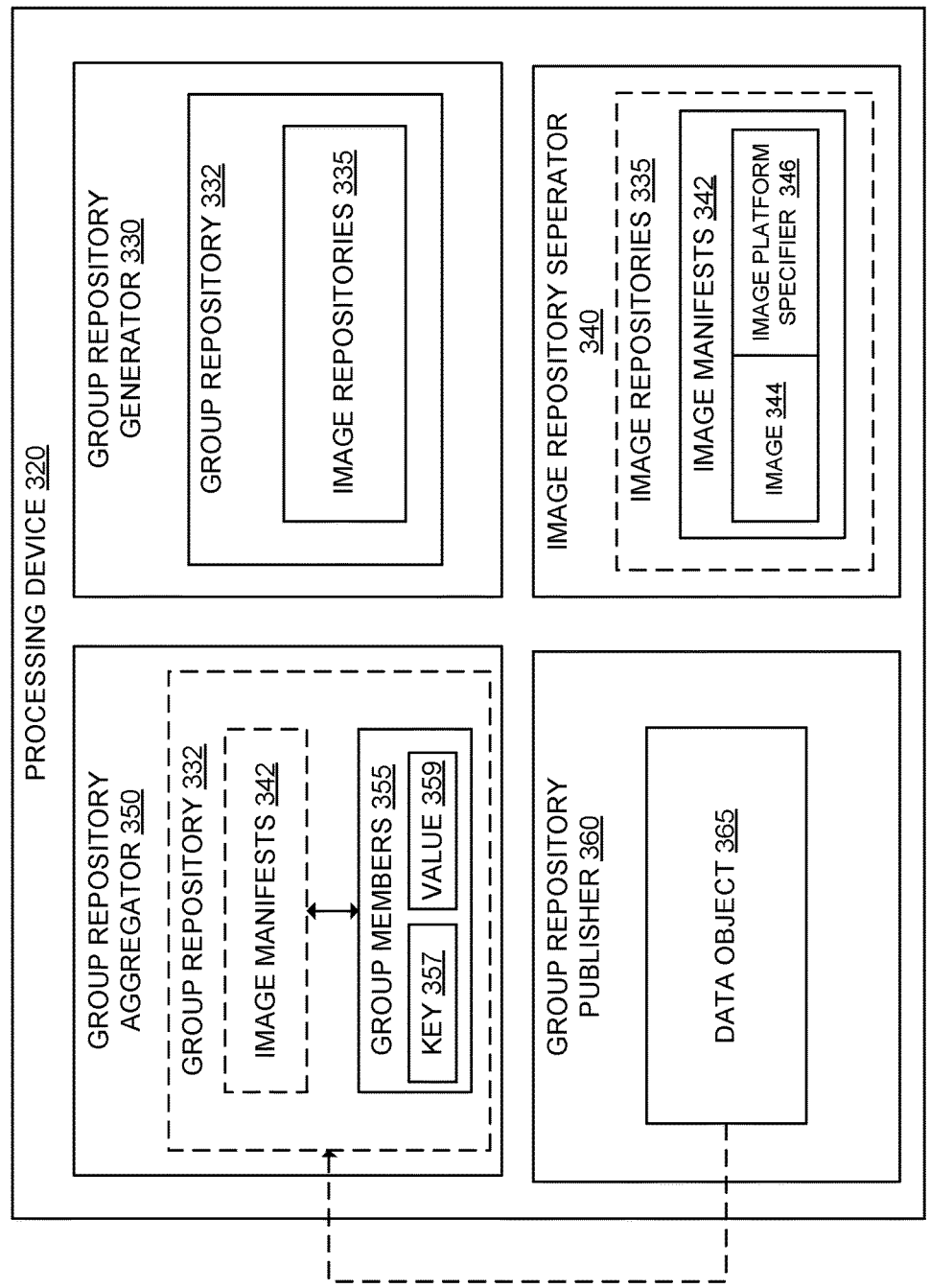
FIG. 3 is a block diagram of an apparatus to support manifest list for multi-platform application container images according to an implementation of the disclosure.

FIG. 3 illustrates a block diagram of an apparatus 300 to support manifest list for multi-platform application container images according to an implementation of the disclosure. The apparatus 200 may be the same or similar to a components within the network architecture 100 of FIG. 1. In some implementations, the apparatus 200 may comprise hardware (circuitry, dedicated logic, etc.), software (e.g., software executed by a general purpose computer system or a dedicated machine), or a combination of both. In some implementations, the apparatus 200 may include processing device 220 may execute instructions for carrying out the operations of the apparatus 200 as discussed herein. As shown, the apparatus 200 may execute instructions for a group repository generator 330, an image repository separator 340, a group repository aggregator 350, and a group repository publisher 360 to make the group repository 332 available to be served to the world at large.

In operation of the apparatus 300, the group repository generator 340 generates a group repository 332 in view of a plurality of image repositories 335 comprising application images 344. For example, the group repository generator 340 generates a path on a CDN service to a location of the group repository 332 on disk.

The image repository separator 330 identifies one or more image manifests 342 from the image repositories 335. Each image manifest 342 is associated with an application image 344 and an image platform specifier 346. The image platform specifier 346 specifies platform resources for executing the application image 344. For example, the image platform specifier 346 may include a plurality of data fields that specifies, for example, the processor architecture, operating system and other data fields associated with executing the application image 344 of the image manifest 342.

The group repository aggregator 350 clusters the image manifest 342 into the one or more group members 335 of the group repository 332 in view of the image platform specifier 346. For example, the group repository aggregator 350 may detect a match between a tag name for a first and second image manifest 342 from the image repositories 335. Based on this match, the group repository aggregator 350 clusters the first image manifest and the second image manifest in a particular group member 355 for that tag name in view of the image platform specifier 346 for each image manifest 342. In that regard, each group member 355 references or is otherwise mapped to at least a key 357 and a value 359 associated with the key 357. The key 357 references a tag name/digest or image blob for the image manifest 342 and the value 359 references a manifest list 267 describing a plurality of platforms to execute the application image 344 associated with the image manifest 342.

The group repository publisher 360 publishes a data object 365 specifying a location of the group repository 342. For example, the group repository publisher 360 provides a data object 365 (e.g., a data file) that comprises the keys 357 and values 350 indicating a path on a CDN service to the locations of content for the group repository 342. Based on this data object 365, a client request to execute a particular image is then redirect to the path on a CDN of the group repository 342.

Figure 4:
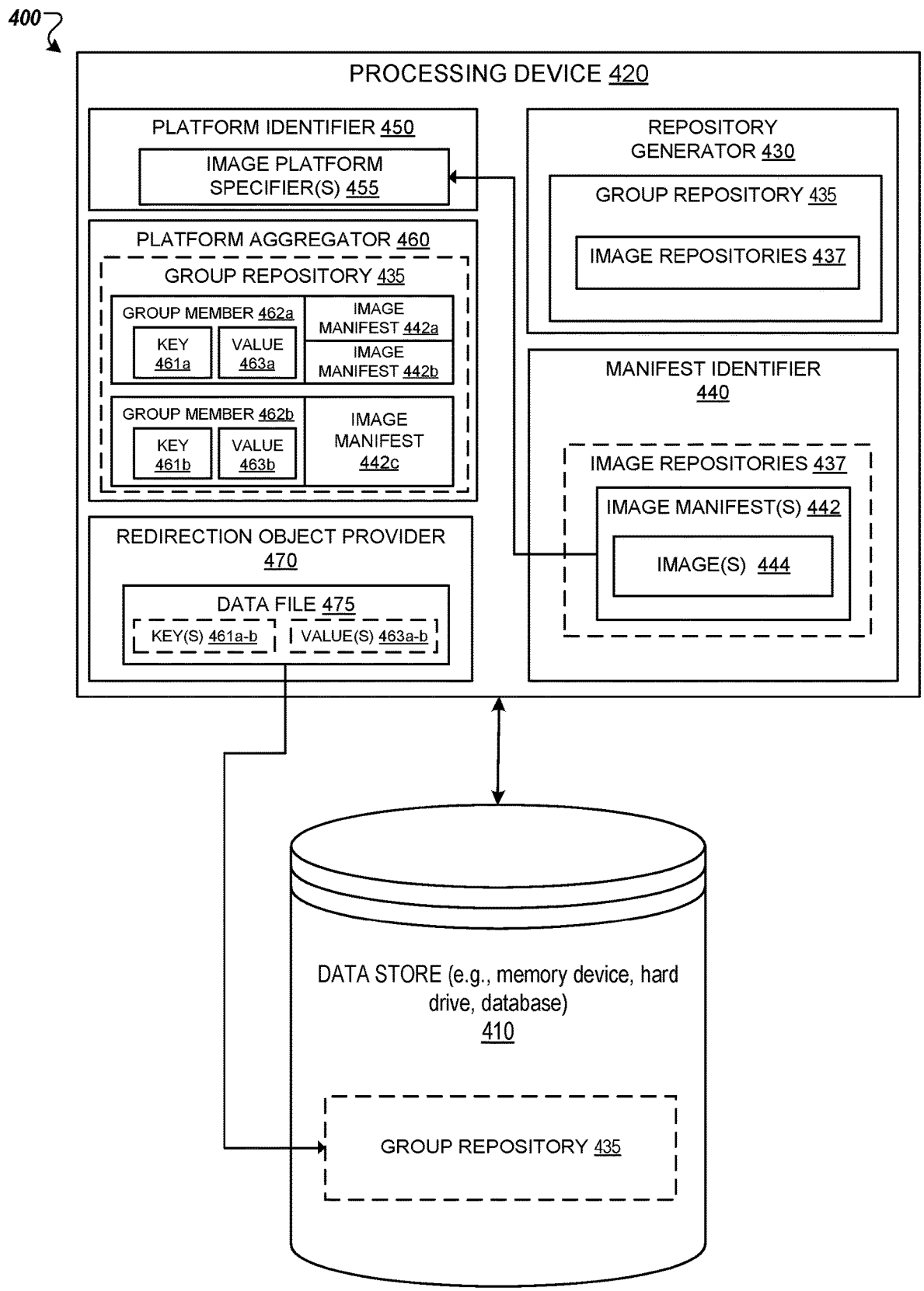
FIG. 4 is a block diagram of a system including a data structure to support manifest list for multi-platform application container images in an implementation of the disclosure.

FIG. 4 is a block diagram of a system 400 including a data structure 410 to support manifest list for multi-platform application container images in an implementation of the disclosure. The system 400 may be the same or similar to the PaaS system 200 of FIG. 2. In some implementations, the system 400 may include processing device 420, operatively coupled to the data structure 410, to execute instructions for carrying out the operations as discussed herein. As shown, the system 200 may execute instructions for a repository generator 430, a manifest identifier 440, a platform identifier 450, a platform aggregator 460, and a redirection object provider 470 to redirect request for images to a group repository comprising multiple platform-specific manifest lists for deploying runtime instances of an application on various platforms.

Data store 410 may include any non-persistent data storage (e.g., memory), persistent and/or volatile data storage (e.g., flash storage, hard drive, tape), other medium, or combination thereof that is capable of storing instructions for carrying out the operations of the apparatus 300 discussed herein. In some implementations, the data store 410 may store image repository data. For example, the images of the image repository can be stored in a path on a content distribution network (CDN) service. This CDN service can mirror locally to the client either part or all of the contents of the image repositories by storing the contents in a particular path. The CDN is used for distributing contents of the image repository in geographic proximity to the client. For example, the contents of the image repositories of the PaaS system may be hosted on a server machine that is geographically dispersed from where the client is running.

The repository generator 430 generates a group repository 435 to store contents of a plurality of image repositories 437. For example, the contents of the group repository 435 can be stored in a path on a content distribution network (CDN) service. This CDN service can mirror locally to the client either part or all of the contents of the image repositories by storing the contents in a particular path via the data store 410. The CDN is used for distributing contents of the image repository in geographic proximity to the client. In some situations, the contents of the group repository 435 can be protected in that the client may have to supply an entitlement certificate to access the content stored therein.

The manifest identifier 430 of system 400 identifies one or more image manifests 442 from a plurality of image repositories 437. Each image manifest 442 to describe an application image 444 stored a corresponding image repository 437. For example, the image manifests 442 provide the data fields for determining the format of an application image in the image repositories 437. These image manifests 442 may be referenced by either a (textual) "tag" string or a hash value (also referred to as a "digest") that is calculated to verify contents in the image manifests 442. Each of the image manifests 442 is a type of data object (e.g., JSON object) describing the image and multiple image "blobs" that are stored in the image repositories 437.

The platform identifier 450 determines an image platform specifier 455 for the image 444 in each of the image manifests 442. The image platform specifier 455 specifies the platform resources intended for executing the images 444. For example, platform identifier 450 inspects the "config" blob associated with image manifests 442 to determine the platform resources, such as the platform architecture and operating system, associated with the image platform specifier 455 for each of the image manifest 442.

The platform aggregator 460 combines the image manifests 442a-c into one or more group members 462a-b of the group repository 435 in view of the image platform specifier 455 for each image manifest 442a-c. Each group member 462a-b references or is otherwise mapped to at least a key 461a-b and a value 436a-b associated with the key 461a-b. The key 461a-b references a tag name/digest or image blob for the image manifest 442a-c and the value 463a-b references a manifest list 267 describing a plurality of platforms to execute the application image 444 associated with the image manifest 442a-c.

In some implementation, platform aggregator 460 detects tags or blobs of image manifest 442a-c that only appears in a single repository. These keys are mapped to the tag name, digest and blobs for a given image manifest, and the values are mapped to the CDN paths to redirect a client for the given image manifest. For keys mapped to tags of image manifest 442a-c common to a multiple repository, the values are a pair of values consisting of (1) a set of manifest list digests generated for manifest lists in the group repository 266, and (2) the CDN path for the group's "default" repository. For backward compatibility, the image manifests of the default image repository are served to clients that do not accept manifest list.

The redirection object provider 470 provides a data file 475 that specifies a location of the group repository 435. For example, the redirection object provider 470 provides a data file 475 that comprises the keys 461a-b and values 463a-b indicating a path on a CDN service to the locations of content for the group repository 435. The redirection object provider 470 provides data file 475 that redirects a client request via client layer 210 of FIG. 2 to execute a particular image to path on a CDN where the group repository 465 is stored.

If the client requests an image manifest, for example, by a digest-or-tag and the digest-or-tag is in the manifest list referenced by the keys 461a-b and values 463a-b, the client is then redirect to the group repository 465 on the CDN. Otherwise, a notification may be provided to the client indicating that the image manifest is not found. In addition, the client may provide information via the command line tools 214 of FIG. 2 indicating whether they accept the manifest list that comprise one or more image manifests stored in the group repository. If the client provides information indicating that they do not accept manifest lists, the client is redirected to the image manifest for the "default" repository of the image manifest associated with the group repository 465.

Figure 5:
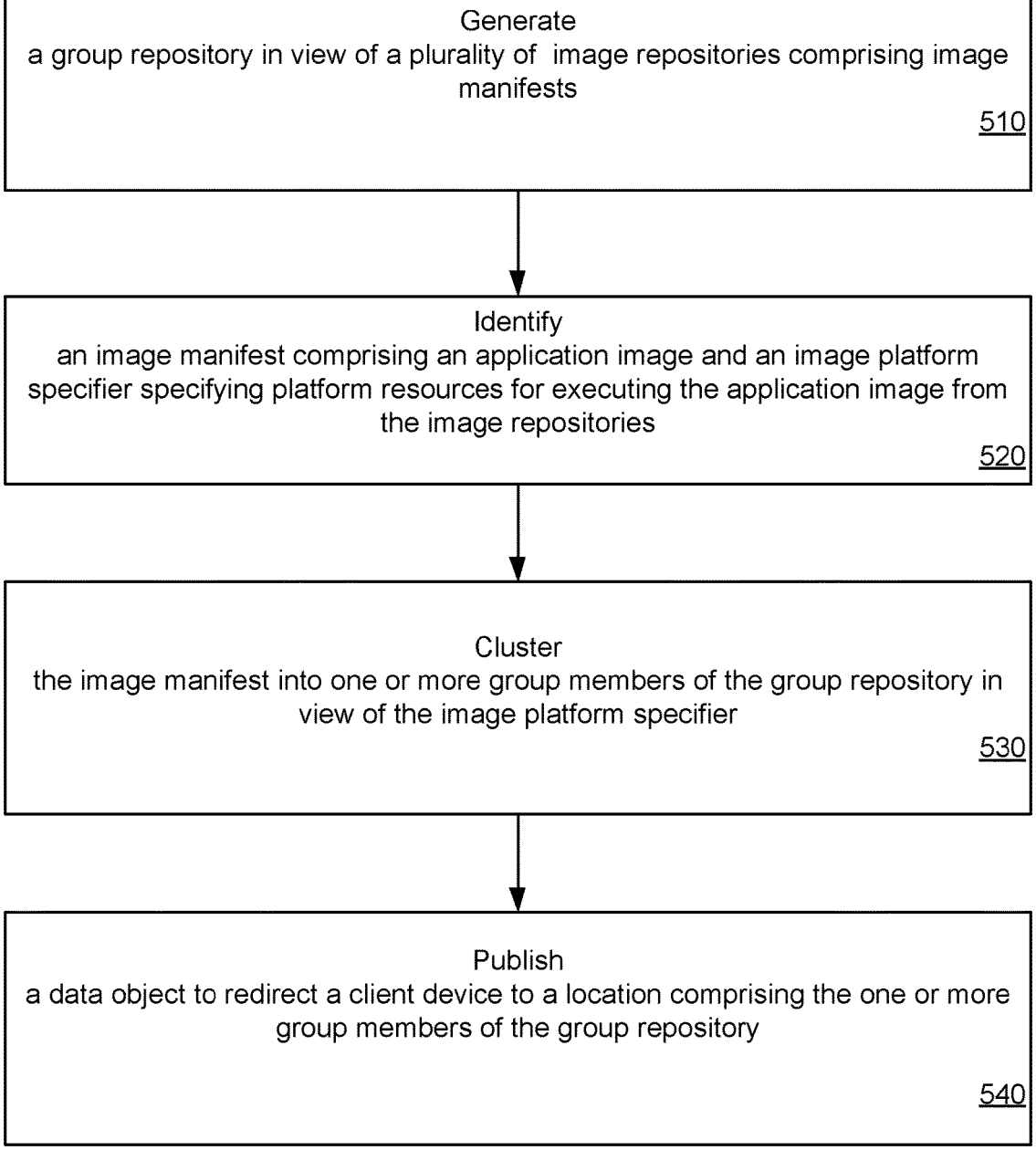
FIG. 5 is a flow diagram of a method of supporting manifest list for multi-platform application container images according to an implementation of the disclosure.

FIG. 5 illustrates a flow diagram of a method 500 of supporting manifest list for multi-platform application container images according to an implementation of the disclosure. In one implementation, method 500 may be performed by the platform clustering component 145 as described herein. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of a PaaS system 100. It should be noted that blocks depicted in FIG. 5 can be performed simultaneously or in a different order than that depicted.

Referring to FIG. 5, method 500 begins at block 510 where a group repository 332 is generated in view of a plurality of image repositories 335 comprising image manifests 342. In block 520, an image manifest 342 comprising an application image 344 and an image platform specifier 346 specifying platform resources for executing the application image 344 is identified from the image repositories 335. In block 530, the image manifest 342 is clustered into one or more group members 355 of the group repository 332 in view of the image platform specifier 346. Each group member 355 references at least a key 357 and a value 359 associated with the key 357. The key 357 references the image manifest 342 and the value references a manifest list 267 describing a plurality of platforms to execute the application image 344 associated with the image manifest 342. In block 540, a data object 365 to redirect a client device to a location comprising the one or more group members 355 of the group repository 332 is published.

Figure 6:
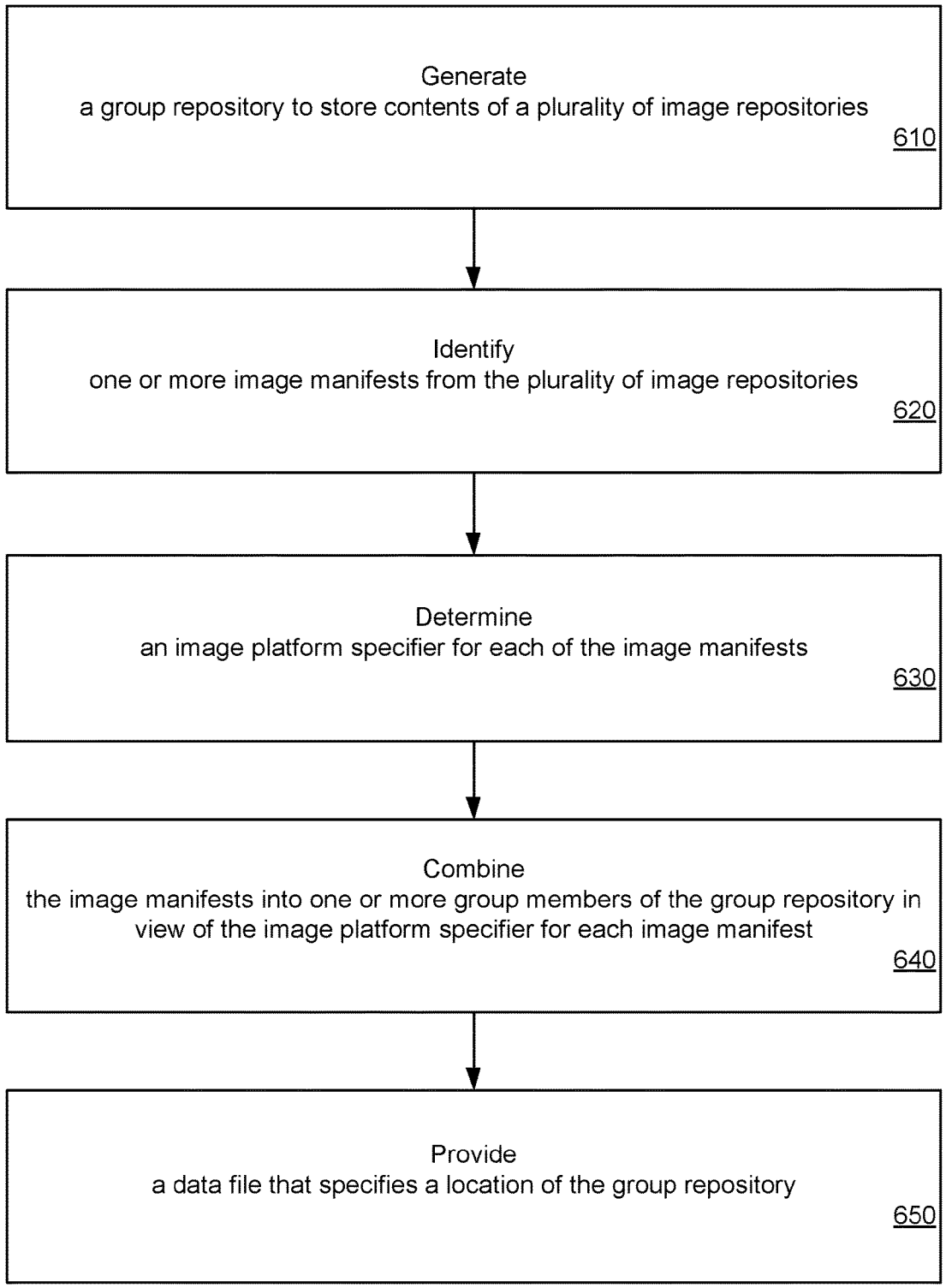
FIG. 6 is a flow diagram of a method of publishing data to support manifest list for multi-platform application container images according to an implementation of the disclosure.

FIG. 6 illustrates a flow diagram of a method 600 of publishing data to support manifest list for multi-platform application container images according to an implementation of the disclosure. In one implementation, method 600 may be performed by the platform clustering component 145 as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of a PaaS system 100. It should be noted that blocks depicted in FIG. 6 can be performed simultaneously or in a different order than that depicted.

Referring to FIG. 6, method 600 begins at block 610 where a group repository 435 to store contents of a plurality of image repositories 437 is generated. In block 620, one or more image manifests 442 are identified from the plurality of image repositories 437. Each image manifest 442 to describe an application image 444 stored a corresponding image repository 437. An image platform specifier 445 is determined in block 630 for each of the image manifests 442. The image platform specifier 445 specifying platform resources for executing the application image 44 associated with the image manifest 442. In block 640, the image manifests 442a-c are combined into one or more group members 462a-b of the group repository 435 in view of the image platform specifier 445 for each image manifest 442. Each group member 462a-b references at least a key 461a-b and a value 463a-b, associated with the key 461a-b. The key 461a-b references a corresponding the image manifest 442a-c and the value 463a-b references a manifest list 267 describing a plurality of platforms to execute the application image 444 associated with the corresponding image manifest 442. In block 650, a data file that specifies a location of the group repository is provided.

Figure 7:
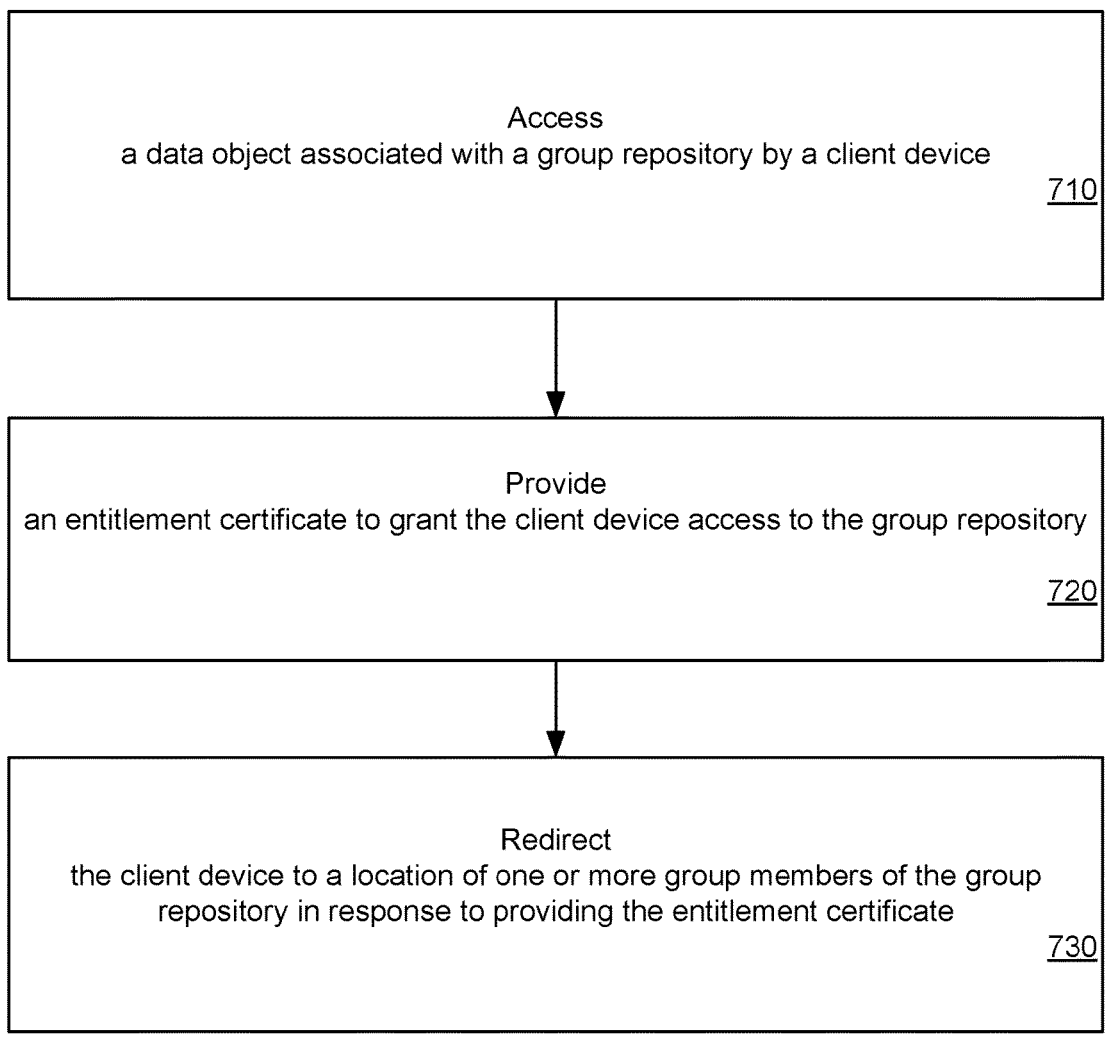
FIG. 7 is a flow diagram of a method of receiving data to support manifest list for multi-platform application container images according to an implementation of the disclosure.

FIG. 7 illustrates a flow diagram of a method 700 of receiving data to support manifest list for multi-platform application container images according to an implementation of the disclosure. In one implementation, method 600 may be performed by any one of the client devices, such as clients (1-N) 160, 170, 180, as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of a PaaS system 100. It should be noted that blocks depicted in FIG. 6 can be performed simultaneously or in a different order than that depicted.

Referring to FIG. 7, method 700 begins at block 710 where a data object 265 associated with a group repository 266 is accessed by a client 210. In block 720, an entitlement certificate 225 to grant access to the client device 210 to the group repository 266 is provided. Responsive to providing the entitlement certificate 225, the client device 210 is redirected to a location of one or more group members 261*a*-*b* of the group repository 266 in block 730. Each group member group members 261*a*-*b* references at least a key 265*a* and a value 265*b* associated with the key 265*a*. The key 265*a* references the image manifest 243*a*-*c* and the value 265*b* references a manifest list 267 describing a plurality of platforms to execute the application image 243*a*-*b* associated with the image manifest 243*a*-*c*.

Figure 8:
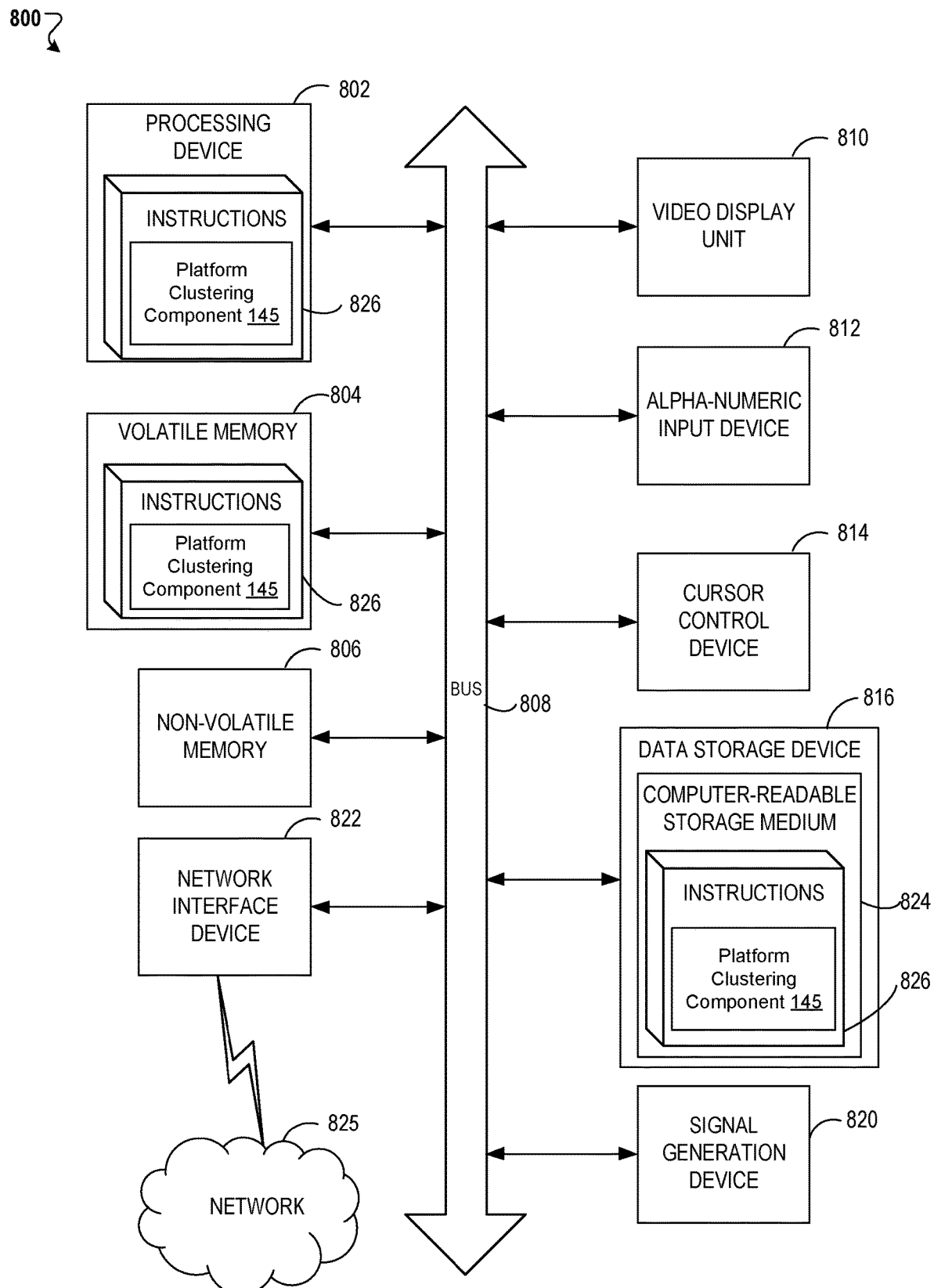
FIG. 8 is a block diagram illustrating a computer system in which implementations of the disclosure may be used.

FIG. 8 illustrates a diagrammatic representation of a machine in the example form of a computer system 800 within which a set of instructions, for causing the machine to perform any one or more of the methodologies discussed herein, may be executed. In various illustrative examples, computer system 800 may correspond to the apparatus 300 of FIG. 3 or the system 400 of FIG. 4. In some implementations, the computer system 800 may support manifest list for multi-platform application container images.

The computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is to execute the processing logic 826 for performing the operations and steps discussed herein.

The computer system 800 may further include a network interface device 822 communicably coupled to a network 825. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Instructions 826 may reside, completely or partially, within volatile memory 804 and/or within processing device 802 during execution thereof by computer system 800, hence, volatile memory 804 and processing device 802 may also constitute machine-readable storage medium 824. The instructions 526 may also implement the platform clustering component 145 to support manifest list for multi-platform application container images.

Data storage device 816 may include a computer-readable storage medium 824 (e.g., a non-transitory computer-readable storage medium) on which may store instructions 826 encoding any one or more of the methods or functions described herein, including instructions for implementing method 400 of FIG. 4, method 500 of FIG. 5 and method 600 of FIG. 6.

The non-transitory machine-readable storage medium 824 may also be used to store instructions 826 to support manifest list for multi-platform application container images described herein, and/or a software library containing methods that call the above applications. While the machine-accessible storage medium 824 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

Example 1 includes a method comprising: generating, by a processing device, a group repository in view of a plurality of image repositories comprising image manifests; identifying, by the processing device, an image manifest comprising an application image and an image platform specifier specifying platform resources for executing the application image from the image repositories; clustering, by the processing device, the image manifest into one or more group members of the group repository in view of the image platform specifier, each group member references at least a key and a value associated with the key, wherein the key references the image manifest and the value references a manifest list describing a plurality of platforms to execute the application image associated with the image manifest; and publishing, by the processing device, a data object to redirect a client device to a location comprising the one or more group members of the group repository.

Example 2 includes the method of example 1, further comprising generating an entitlement certificate to grant access to the location of the group repository.

Example 3 includes the method of examples 1-2, further comprising: detecting a match between a tag name for a first image manifest and a second image manifest from the image repositories; and responsive to detecting the match, clustering the first image manifest and the second image manifest in a correspond group member in view of the image platform specifier for each image manifest.

Example 4 includes the method of examples 1-3, wherein the image platform specifier for the first image manifest is different from the image platform specifier for the second image manifest.

Example 5 includes the method of examples 1-4, wherein the key references a tag name and digest for the image manifest and the value references a location to an image repository to redirect the client device for access to the image manifest.

Example 6 includes the method of examples 1-5, wherein the key references a data blob for the image manifest and the value references a path to an image repository to redirect the client device for access to the image manifest.

Example 7 includes the method of examples 1-6, wherein the key references a tag name for the image manifest and the value references a set of image digests for the image manifest and a location of an image repository of a default platform for the image manifest.

Example 8 includes a system comprising: a memory to store repository data; and a processing device, operatively coupled to the memory, to: generate a group repository to store contents of a plurality of image repositories; identify, by the processing device, one or more image manifests from the plurality of image repositories, each image manifest to describe an application image stored a corresponding image repository; determine an image platform specifier for each of the image manifests, the image platform specifier specifying platform resources for executing the application image associated with the image manifest; combine the image manifests into one or more group members of the group repository in view of the image platform specifier for each image manifest, each group member references at least a key and a value associated with the key, wherein the key references a corresponding the image manifest and the value references a manifest list describing a plurality of platforms to execute the application image associated with the corresponding image manifest; and provide a data file that specifies a location of the group repository.

Example 9 includes the system of example 8, wherein the processing device is further to generate an entitlement certificate to grant access to the location of the group repository.

Example 10 includes the system of examples 8-9, wherein the processing device is further to: detecting a match between a tag name for a first image manifest and a second image manifest from the image repositories; and responsive to detecting the match, cluster the first image manifest and the second image manifest in a correspond group member in view of the image platform specifier for each image manifest.

Example 11 includes the system of examples 8-10, wherein the image platform specifier for the first image manifest is different from the image platform specifier for the second image manifest.

Example 12 includes the system of examples 8-11, wherein the key references a tag name and digest for the image manifest and the value references a location to an image repository to redirect the client device for access to the image manifest.

Example 13 includes the system of examples 8-12, wherein the key references a data blob for the image manifest and the value references a path to an image repository to redirect the client device for access to the image manifest.

Example 14 includes the system of examples 8-13, wherein the key references a tag name for the image manifest and the value references a set of image digests for the image manifest and a location of an image repository of a default platform for the image manifest.

Example 15 includes a non-transitory computer-readable medium comprising instructions that, when executed by a processing device, cause the processing device to: generate a group repository to store contents of a plurality of image repositories; identify, by the processing device, one or more image manifests from the plurality of image repositories, each image manifest to describe an application image stored a corresponding image repository; determine an image platform specifier for each of the image manifests, the image platform specifier specifying platform resources for executing the application image associated with the image manifest; combine the image manifests into one or more group members of the group repository in view of the image platform specifier for each image manifest, each group member references at least a key and a value associated with the key, wherein the key references a corresponding the image manifest and the value references a manifest list describing a plurality of platforms to execute the application image associated with the corresponding image manifest; and provide a data file that specifies a location of the group repository.

Example 16 includes the non-transitory computer-readable medium of example 15, wherein the processing device is further to generate an entitlement certificate to grant access to the location of the group repository.

Example 17 includes the non-transitory computer-readable medium of examples 15-16, wherein the processing device is further to: detecting a match between a tag name for a first image manifest and a second image manifest from the image repositories; and responsive to detecting the match, cluster the first image manifest and the second image manifest in a correspond group member in view of the image platform specifier for each image manifest.

Example 18 includes the non-transitory computer-readable medium of examples 15-17, wherein the image platform specifier for the first image manifest is different from the image platform specifier for the second image manifest.

Example 19 includes the non-transitory computer-readable medium of examples 15-18, wherein the key references a tag name and digest for the image manifest and the value references a location to an image repository to redirect the client device for access to the image manifest.

Example 20 includes the non-transitory computer-readable medium of examples 15-19, wherein the key references a data blob for the image manifest and the value references a path to an image repository to redirect the client device for access to the image manifest.

Example 21 includes the non-transitory computer-readable medium of examples 15-20, wherein the key references a tag name for the image manifest and the value references a set of image digests for the image manifest and a location of an image repository of a default platform for the image manifest.

Example 22 includes an apparatus comprising: a processing device; means for generating a group repository in view of a plurality of image repositories comprising image manifests; means for identifying an image manifest comprising an application image and an image platform specifier specifying platform resources for executing the application image from the image repositories; means for clustering the image manifest into one or more group members of the group repository in view of the image platform specifier, each group member references at least a key and a value associated with the key, wherein the key references the image manifest and the value references a manifest list describing a plurality of platforms to execute the application image associated with the image manifest; and means for publishing a data object to redirect a client device to a location comprising the one or more group members of the group repository.

Example 23 includes the apparatus of example 22, further comprising means for generating an entitlement certificate to grant access to the location of the group repository.

Example 24 includes the apparatus of examples 22-23, further comprising: means for detecting a match between a tag name for a first image manifest and a second image manifest from the image repositories; and means for, responsive to detecting the match, clustering the first image manifest and the second image manifest in a correspond group member in view of the image platform specifier for each image manifest.

Example 25 includes the apparatus of examples 22-24, wherein the image platform specifier for the first image manifest is different from the image platform specifier for the second image manifest.

Example 26 includes the apparatus of examples 22-25, wherein the key references a tag name and digest for the image manifest and the value references a location to an image repository to redirect the client device to access to the image manifest.

Example 27 includes the apparatus of examples 22-26, wherein the key references a data blob for the image manifest and the value references a path to an image repository to redirect the client device for access to the image manifest.

Example 28 includes the apparatus of examples 22-27, wherein the key references a tag name for the image manifest and the value references a set of image digests for the image manifest and a location of an image repository of a default platform for the image manifest.

Example 29 includes a method comprising: accessing, by a processing device of a client device, a data object associated with a group repository; providing, by the processing device, an entitlement certificate to grant the client device access to the group repository; and responsive to providing the entitlement certificate, redirect, by the processing device, the client device to a location of one or more group members of the group repository, each group member references at least a key and a value associated with the key, wherein the key references the image manifest and the value references a manifest list describing a plurality of platforms to execute the application image associated with the image manifest.

Example 30 includes the method of examples 29, further comprising the subject matter of any of examples 1-28.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "separating", "generating", "clustering", "publishing", "identifying" "determining", "combining", "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a processing device, an image manifest associated with an application image;
   associating the image manifest with a plurality of groups, wherein each group of the plurality of groups references at least one execution platform for executing an instance of the application image associated with the image manifest;
   generating a data object referencing a location of an image repository storing the plurality of groups; and
   utilizing the data object to redirect a client device to the location of the image repository.

2. The method of claim 1, further comprising:
   generating an entitlement certificate to grant access to the image repository.

3. The method of claim 1, further comprising:
   detecting a match between a first tag name of a first image manifest and a second tag name of a second image manifest; and
   associating the first image manifest and the second image manifest with a group of the plurality of groups.

4. The method of claim 3, wherein a first execution platform identifier of the first image manifest is different from a second execution platform identifier of the second image manifest.

5. The method of claim 1, wherein each group of the plurality of groups is associated with a key-value pair comprising a key and a value associated with the key, wherein the key references the application image, and wherein the value references the image repository.

6. The method of claim 1, wherein each group of the plurality of groups is associated with a key-value pair comprising a key and a value associated with the key, wherein the key references a data blob associated with the image manifest, and wherein the value references the image repository.

7. The method of claim 1, each group of the plurality of groups is associated with a key-value pair comprising a key and a value associated with the key, wherein the key references a tag name for the image manifest, and wherein the value references a set of image digests for the image manifest.

8. A system comprising:
   a memory to store repository data; and
   a processing device, operatively coupled to the memory, to:
      identify an image manifest associated with an application image;
      generate a data object referencing a location of an image repository storing a plurality of groups associated with the image manifest, wherein each group of the plurality of groups references at least one execution platform for executing an instance of the application image;
      generate an entitlement certificate to grant access to the image repository; and
      utilize the data object to redirect a client device to the location of the image repository.

9. The system of claim 8, wherein the processing device is further to:
   detect a match between a first tag name of a first image manifest and a second tag name of a second image manifest; and
   associate the first image manifest and the second image manifest with a group of the plurality of groups.

10. The system of claim 9, wherein a first execution platform identifier of the first image manifest is different from a second execution platform identifier of the second image manifest.

11. The system of claim 8, wherein each group of the plurality of groups is associated with a key-value pair comprising a key and a value associated with the key, wherein the key references the application image, and wherein the value references the image repository.

12. The system of claim 8, wherein each group of the plurality of groups is associated with a key-value pair comprising a key and a value associated with the key, wherein the key references a data blob associated with the image manifest, and wherein the value references the image repository.

13. The system of claim 8, each group of the plurality of groups is associated with a key-value pair comprising a key and a value associated with the key, wherein the key references a tag name for the image manifest, and wherein the value references a set of image digests for the image manifest.

14. A non-transitory computer-readable medium comprising instructions that, when executed by a processing device, cause the processing device to:

identify an image manifest associated with an application image;

associate the image manifest with a plurality of groups, wherein each group of the plurality of groups references at least one execution platform for executing an instance of the application image associated with the image manifest; and generate a data object referencing a location of an image repository storing the plurality of groups; and utilize the data object to redirect a client device to the location of the image repository.

15. The non-transitory computer-readable medium of claim 14, further comprising executable instructions causing the processing device to:

generate an entitlement certificate to grant access to the image repository.

16. The non-transitory computer-readable medium of claim 14, further comprising executable instructions causing the processing device to:

detect a match between a first tag name of a first image manifest and a second tag name of a second image manifest; and associate the first image manifest and the second image manifest with a group of the plurality of groups.

17. The non-transitory computer-readable medium of claim 14, wherein each group of the plurality of groups is associated with a key-value pair comprising a key and a value associated with the key, wherein the key references the application image, and wherein the value references the image repository.

18. The non-transitory computer-readable medium of claim 14, wherein each group of the plurality of groups is associated with a key-value pair comprising a key and a value associated with the key, wherein the key references a data blob associated with the image manifest, and wherein the value references the image repository.

19. The non-transitory computer-readable medium of claim 14, each group of the plurality of groups is associated with a key-value pair comprising a key and a value associated with the key, wherein the key references a tag name for the image manifest, and wherein the value references a set of image digests for the image manifest.

* * * * *